United States Patent
Reis et al.

(10) Patent No.: US 9,535,768 B2
(45) Date of Patent: Jan. 3, 2017

(54) MANAGING MULTI-THREADED OPERATIONS IN A MULTIMEDIA AUTHORING ENVIRONMENT

(71) Applicants: SONY CORPORATION, Tokyo (JP); SONY PICTURES TECHNOLOGIES INC., Culver City, CA (US)

(72) Inventors: Jorge A. Reis, Culver City, CA (US); Michael K. Thompson, Los Angeles, CA (US); John B. Ying, Redondo Beach, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 525 days.

(21) Appl. No.: 13/943,609

(22) Filed: Jul. 16, 2013

(65) Prior Publication Data

US 2014/0019986 A1    Jan. 16, 2014

Related U.S. Application Data

(60) Provisional application No. 61/672,052, filed on Jul. 16, 2012.

(51) Int. Cl.
| | |
|---|---|
| G06F 9/52 | (2006.01) |
| G06F 17/30 | (2006.01) |
| G06F 13/16 | (2006.01) |
| G11B 27/031 | (2006.01) |
| G06F 9/48 | (2006.01) |

(52) U.S. Cl.
CPC .............. *G06F 9/52* (2013.01); *G06F 9/4843* (2013.01); *G06F 13/16* (2013.01); *G06F 17/30165* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 6,834,386 B1 | 12/2004 | Douceur et al. | |
| 9,104,500 B1 * | 8/2015 | Krikellas | G06F 9/52 |
| 2003/0140085 A1 | 7/2003 | Moir et al. | |
| 2004/0153687 A1 * | 8/2004 | Moir | G06F 9/526 |
| | | | 714/1 |

(Continued)

OTHER PUBLICATIONS

International Search Report issued in copending PCT application No. PCT/US201350734 on Jan. 15, 2014.

*Primary Examiner* — Qing Wu
(74) *Attorney, Agent, or Firm* — Procopio, Cory, Harvreaves & Savitch LLP

(57) ABSTRACT

Managing multi-threaded computer processing, including: processing a main thread for an object in background of the multi-threaded computer processing without locking the object during its process in the background, wherein processing a main thread includes: monitoring the state of the object, wherein the object is deemed ready for processing after it satisfies a set of rules to check for its completeness, and the object has not been modified for a pre-determined period of time; creating and adding tasks to a queue for processing once the object is ready; and packaging required information for the tasks into a single data structure that is passed to a task thread and returned to the main thread upon completion.

17 Claims, 4 Drawing Sheets

(56) References Cited

U.S. PATENT DOCUMENTS

| | | | |
|---|---|---|---|
| 2006/0037026 A1* | 2/2006 | Doherty | G06F 12/0261 |
| | | | 719/310 |
| 2006/0075408 A1 | 4/2006 | Powers et al. | |
| 2010/0023707 A1* | 1/2010 | Hohmuth | G06F 9/466 |
| | | | 711/152 |
| 2011/0296212 A1 | 12/2011 | Elnozahy et al. | |
| 2011/0296420 A1 | 12/2011 | Pegushin et al. | |
| 2013/0247053 A1* | 9/2013 | Therrien | G06F 9/526 |
| | | | 718/102 |

* cited by examiner

MANAGING MULTI-THREADED OPERATIONS IN A MULTIMEDIA AUTHORING ENVIRONMENT

CROSS-REFERENCE TO RELATED APPLICATIONS

This application claims the benefit of priority under 35 U.S.C. §119(e) of U.S. Provisional Patent Application No. 61/672,052, filed Jul. 16, 2012, entitled "Managing Multi-Threaded Operations in a Multimedia Authoring Environment". The disclosure of the above-referenced application is incorporated herein by reference.

BACKGROUND

Field of the Invention

The present invention relates to multi-threading, and more specifically, to managing multi-threaded operations in a multimedia authoring environment.

Background

In a multimedia authoring system, audio, visual, and interactive assets need to be prepared and multiplexed together to create a package that can be delivered. For the Blu-ray Disc ROM format, each disc may contain one or more clip files, where each clip contains audio, visual, and interactive content multiplexed together. Traditionally, audio, visual and interactive content are added to the clip in sequence, while the author waits for each step to complete before moving onto the next step. This traditional approach was often used in the past due to slow computer performance and very heavy storage input/output load demands usually associated with multimedia content authoring. Additionally, multiplexing a clip is computationally intensive yet it is a sequential process because each video frame's timing and memory management significantly depends on the results of previous frame, thus it does not lend itself well to parallel processing techniques used in other computational intensive applications. However, modern technology now incorporates multiple CPU cores within a single computer, and often times the extra cores are idling during user operation. This new system allows the user and system to continue normal authoring activities and operations without having to wait for each operation to finish.

SUMMARY

The present invention provides for managing multi-threaded operations in a multimedia authoring environment.

In one implementation, a method of managing multi-threaded computer processing is disclosed. The method includes: processing a main thread for an object in background of the multi-threaded computer processing without locking the object during its process in the background, wherein processing a main thread includes: monitoring the state of the object, wherein the object is deemed ready for processing after it satisfies a set of rules to check for its completeness, and the object has not been modified for a pre-determined period of time; creating and adding tasks to a queue for processing once the object is ready; and packaging required information for the tasks into a single data structure that is passed to a task thread and returned to the main thread upon completion.

In another implementation, a system of managing multi-threaded computer processing is disclosed. The system includes: a main thread processor configured to process an object in background of the multi-threaded computer processing without locking the object during its process in the background, wherein the main thread processor includes: an object monitor to monitor the state of the object, wherein the object is deemed ready for processing after it satisfies a set of rules to check for its completeness, and the object has not been modified for a pre-determined period of time; a task creator to create and add tasks to a queue for processing once the object is ready; and a packager configured to package required information for the tasks into a single data structure that is passed to a task thread and returned to the main thread upon completion.

In another implementation, a non-transitory storage medium storing a computer program to manage multi-threaded computer processing is disclosed. The computer program includes executable instructions that cause the computer to: process a main thread for an object in background of the multi-threaded computer processing without locking the object during its process in the background, wherein the executable instructions that cause the computer to process a main thread includes executable instructions that cause the computer to: monitor the state of the object, wherein the object is deemed ready for processing after it satisfies a set of rules to check for its completeness, and the object has not been modified for a pre-determined period of time; create and add tasks to a queue for processing once the object is ready; and package required information for the tasks into a single data structure that is passed to a task thread and returned to the main thread upon completion.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Figure 1:
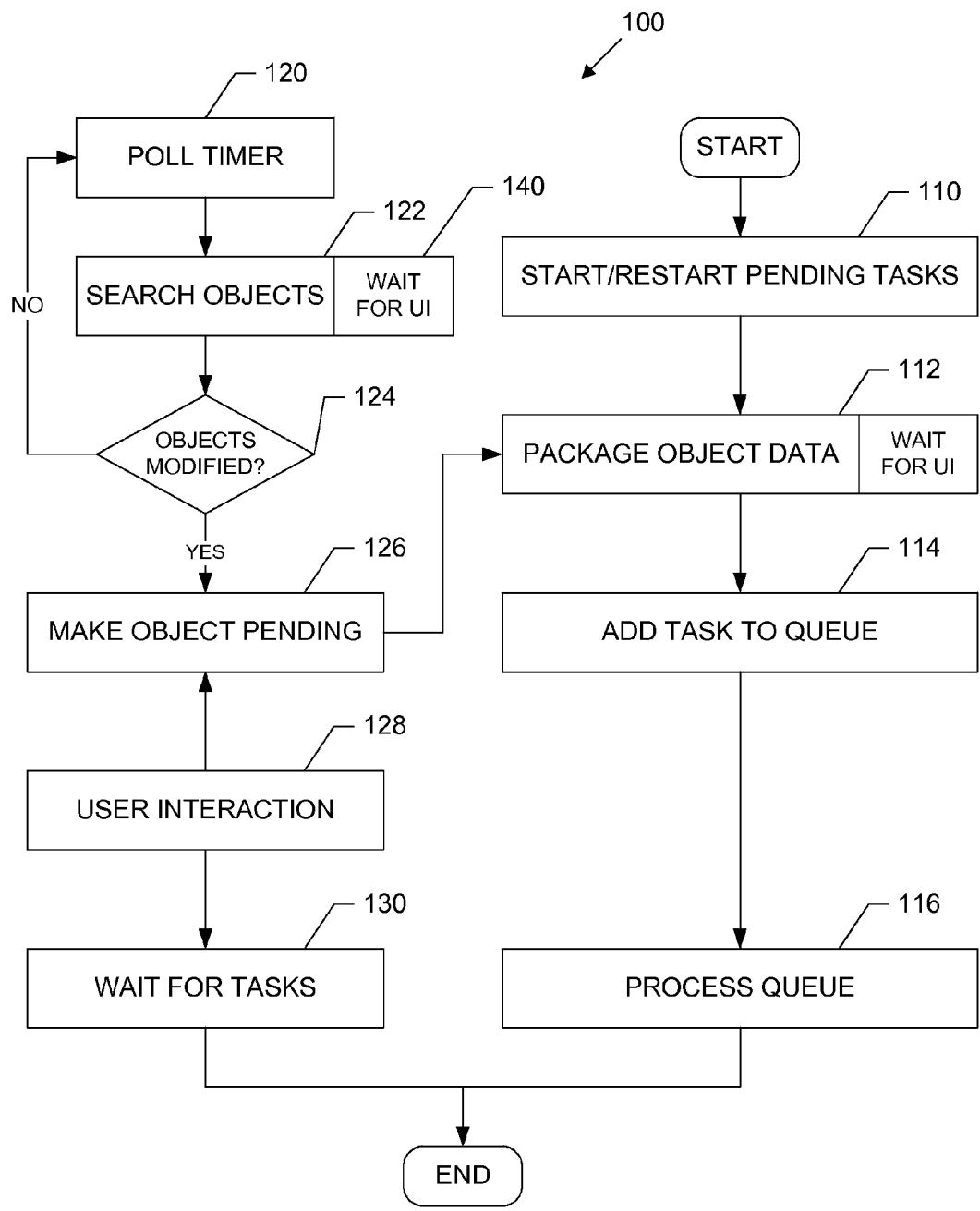
FIG. 1 is a flow diagram illustrating a media authoring method for processing a main thread for an object in accordance with one implementation of the present invention.

As described above, in conventional systems, audio, visual and interactive content are added to the clip in sequence, while the author waits for each step to complete before moving onto the next step, and the extra cores of a multiple core computer are idling during user operation. Certain implementations as disclosed herein provide for managing a multi-threaded multimedia authoring environment to utilize idle computing power for the processing of tasks in the background to reduce wait time and improve user productivity. In one implementation, task throttling is used to maintain smooth user experience while processing active tasks in the background. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Authoring projects include many audio, video, and interactive content objects. In one implementation, a computer system provides an authoring system with functions and an interface for user interaction to facilitate creating and editing data for multimedia content, such as a movie stored on a Blu-ray Disc. For a movie, the content includes the audio and video for the movie itself as well as supporting content, such as the menus and images for a user to navigate the content, and additional content, such as commentary or additional scenes. The data for the content includes multiple objects for different parts of the content. The system manipulates the data for the objects to create the final product in the form determined by a user. In one implementation, the system includes a scheduler to control the execution of tasks, which include operations on data for user selections. The scheduler oversees the entire background processing activities of the authoring system.

In one implementation, an authoring system uses multi-threading. Time consuming processes are identified and modified to create encapsulated tasks that only require a single data input/output communication between other tasks. Each task's load on a typical computer is measured and recorded within the scheduler. Input data to the task is prepared by the main user interface thread and saved in storage. When the scheduler launches the task, input data is passed to the task for processing. That is, the object's data is wrapped by the task and is made part of the task's structure. Thus, the object's data is replicated and added to the task's structure (e.g., in packaging step 112) before the task is added to the queue (e.g., at step 114). Returned data from completed tasks is held while user inputs are handled. When user input has stopped, returned data is handed back to the main user interface thread in a single update operation to eliminate race conditions and ensure user interaction is not blocked. The tasks have the ability to begin, pause, and abort. If an object is modified while the object's task is being processed in the background, the scheduler sends the signal to the task to abort, and a new task will be created once the object becomes ready again.

In some existing multi-threaded parallel computing environments, an object that is being processed is usually locked to prevent data corruption due to race condition. In one implementation of an authoring system, the system does not forbid any objects from being changed while it is undergoing processing. Rather the object's data is encapsulated and not committed back to the main user interface thread until the task is completed. Any modification to the object before the task is completed results in the in-process data being discarded. One benefit of this approach is easier updates of legacy software to utilize multi-core CPU computers.

FIG. 1 is a flow diagram 100 illustrating a media authoring method for processing a main thread for an object in accordance with one implementation of the present invention. This processing of the thread is configured to substantially reduce the locking of the object during its processing in the background such that the original object can continue to be edited, even if it has an ongoing task pending or running. Thus, by substantially reducing the locking of the object, the user can add other streams to the object (or change an object's property, such as the object's name) while the object's individual streams are being processed in the background.

In the illustrated implementation of FIG. 1, the processing of the main thread involves adding to a queue including user interaction, program interaction, and application restart. For example, the user interaction 128 results in either an object being pending 126 or waiting for tasks 130. The program interaction includes polling timer 120 and searching objects 122, wherein the object searching step 122 may include waiting for the user interaction, at step 140. Polling timer 120 is a call that checks the queue and is started by an internally-defined timer of the main thread. Polling timer at step 120 may include setting polling timer delta. If it is determined, at step 124, that objects have been modified, the modified objects are then put into a pending state, at step 126. Otherwise, if the objects have not been modified, then the processing returns to the polling timer, at step 120. The application restart includes restarting pending tasks, at step 110.

Object data of the pending objects is then packaged, at step 112. As stated above, the objects can be put into a pending state (e.g., at step 126) from a user interaction (e.g., step 128) or when it is determined that the objects are modified (e.g., step 124). A task is then added to the queue, at step 114. Once the task is added to the queue, the queue is processed, at step 116. As stated above, once the object is packaged or the object's data is wrapped by the task and is made part of the task's structure, the object's data is replicated and added to the task's structure in packaging step 112 before the task is added to the queue at step 114. The packaging step is later followed by an un-packaging step (e.g., step 440) of the data once the task finishes, which is the reverse of step 112.

Accordingly, the media authoring method of FIG. 1 actively monitors the state of each object, where an object is deemed ready for processing after it satisfies a set of rules to check for its completeness, and has not been modified for a pre-determined period of time. Regarding the set of rules, each object in the main thread has a state property, which is set whenever the application rules associated with a user action run. For example, the user adds a new audio stream structure to an existing parent object, but without an audio file the object's state is set to 'Incomplete'. Since the background process queue tasks for complete objects only, once the user adds the missing audio file, then the task becomes complete and the process for that audio stream is queued to the background. The polling timer steps 120 and 422 check for the completed objects, and add them to the queue as needed. Once the background task runs, the audio stream state is set to 'Multiplexed'. Some background tasks are started by a user action such as importing an audio, video file or subtitle file, while others are started by the polling timer.

Once an object is ready, a task is created and added to a queue for processing. The data processing task is then sent to the queue. The required information for the task is packaged into a single data structure that can be passed to a task thread and returned to the main thread upon completion. The single data structure is a wrapper structure that carries pending object's data (see steps 124 and 126) as well as other state and type data. Thus, this structure represents an array of tasks that is added to the process queue at step 116. The array can be used in steps 130, 122, 310, 410, and 460. The task data structure can also be individually used in steps 114, 342, 344, 430, and 450.

Figure 2:
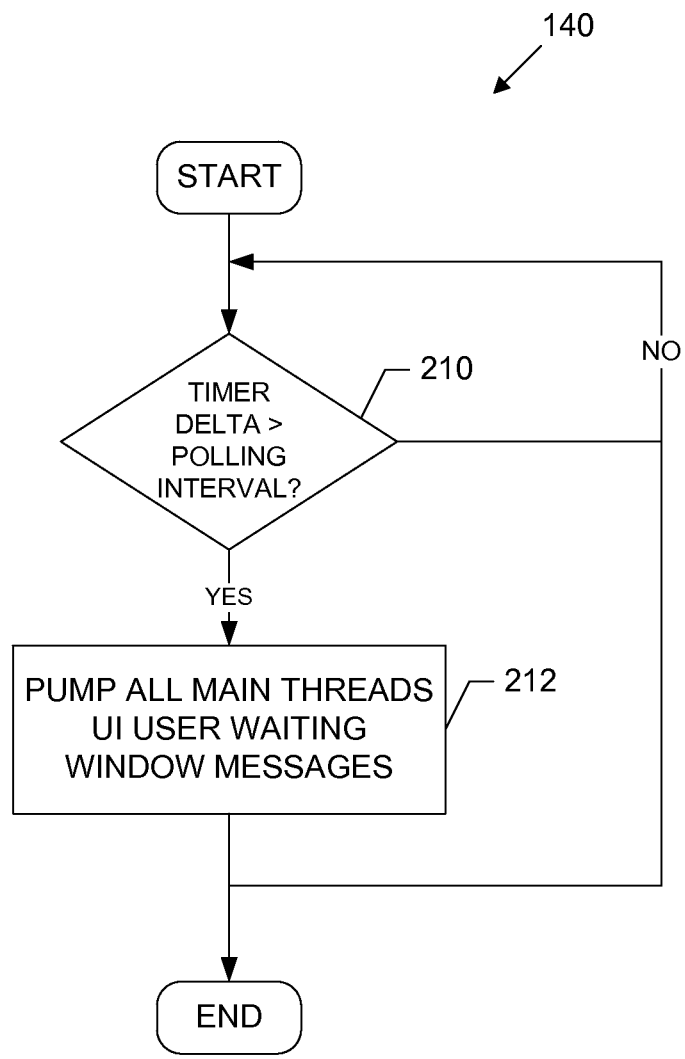
FIG. 2 is a flow diagram illustrating a method for step 140 (see FIG. 1) which includes waiting for the user interaction.

FIG. 2 is a flow diagram 140 illustrating a method for step 140 (see FIG. 1) which includes waiting for the user interaction. In the illustrated implementation of FIG. 2, a determination is made, at step 210, whether a timer delta is greater than a polling interval, which defines how often the polling timer call runs (e.g. every 8 seconds). If it is determined that the timer delta is greater than the polling interval, then all main threads are pumped (or emptied), at step 212. Otherwise, the processing waits until the timer delta exceeds the polling interval.

Figure 3:
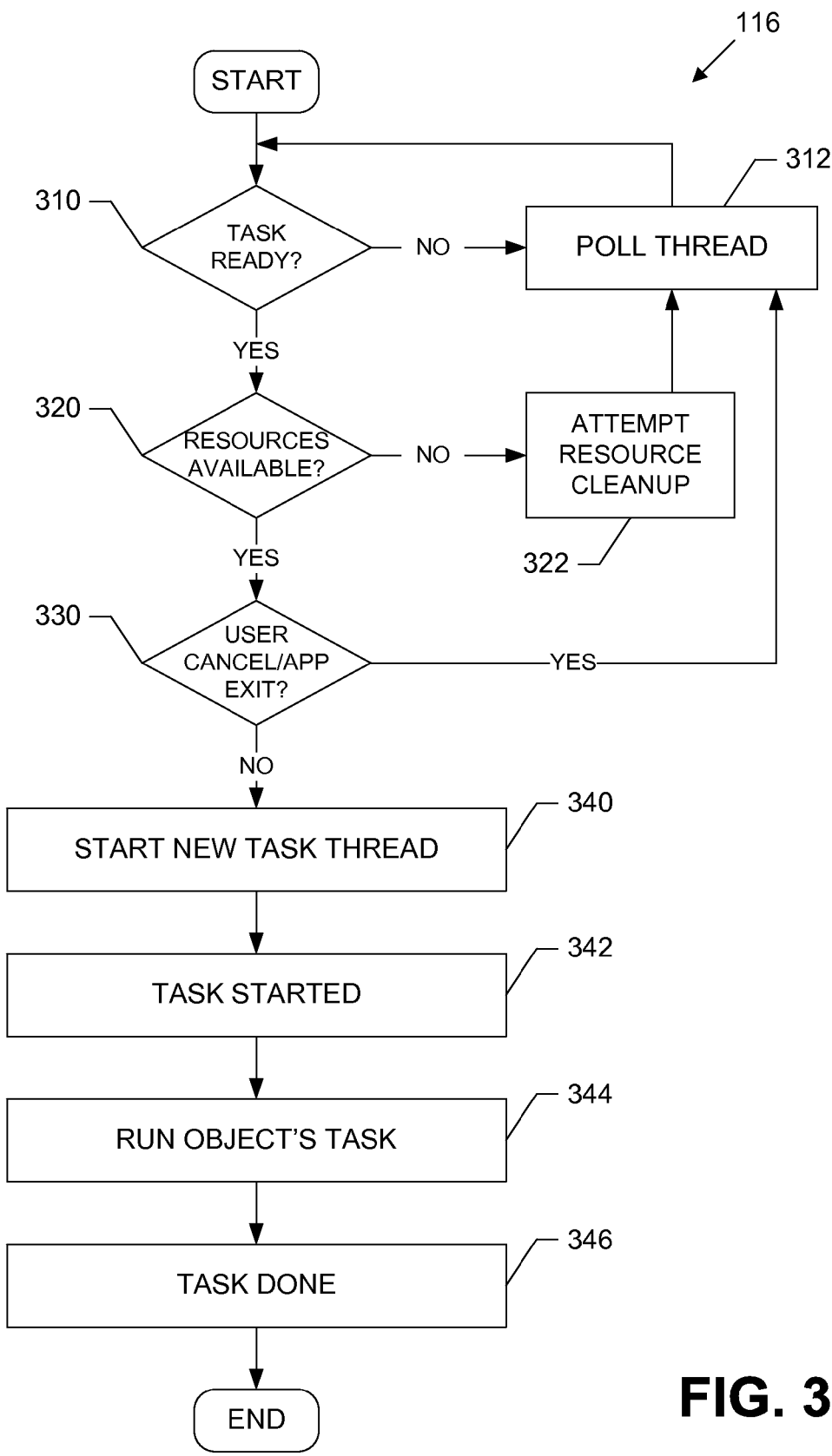
FIG. 3 is a flow diagram illustrating a media authoring method for processing a thread for an object in the background in accordance with another implementation of the present invention.

FIG. 3 is a flow diagram 116 illustrating a media authoring method for processing a thread for an object in the background in accordance with another implementation of the present invention. The processing of the thread in FIG. 3 illustrates step 116 (i.e., processing a queue) shown in FIG. 1.

In the illustrated implementation of FIG. 3, a determination is made, at step 310, whether a task is ready. If it is determined that the task is not ready, then threads are polled, at step 312. Otherwise, if the task is ready, another determination is made, at step 320, whether resources are available. If the resources are not available, then resource cleanup is attempted, at step 322. Otherwise, if the resources are available, another determination is made, at step 330, whether there was a cancel by the user or application exit. If no user cancel or application exit has been detected, then a new task thread is started, at step 340. The new task is then started, at step 342, the object's task is run, at step 344, and the task is then done, at step 346.

Accordingly, in the media authoring method of FIG. 3, a scheduler launches the tasks that are ready based on current CPU load and number of CPU cores, and only launches enough tasks to keep below a configured maximum load threshold. The scheduler also monitors system resource usage load, and throttles down if the system is under heavy load, by slowing down tasks and forcing memory garbage collection. Each task is able to pause and save its current state in case the system needs to stop or is asked to be terminated before the task is finished. Unfinished tasks are resumed once the system restarts. Thresholds and concurrent tasks are configurable parameters in the scheduler to tune the behavior for each individual machine's performance. Productivity can be gained by reducing any wait time traditionally required on the end user, while computer's utilization increases to perform tasks that are suitable to be done automatically.

Figure 4:
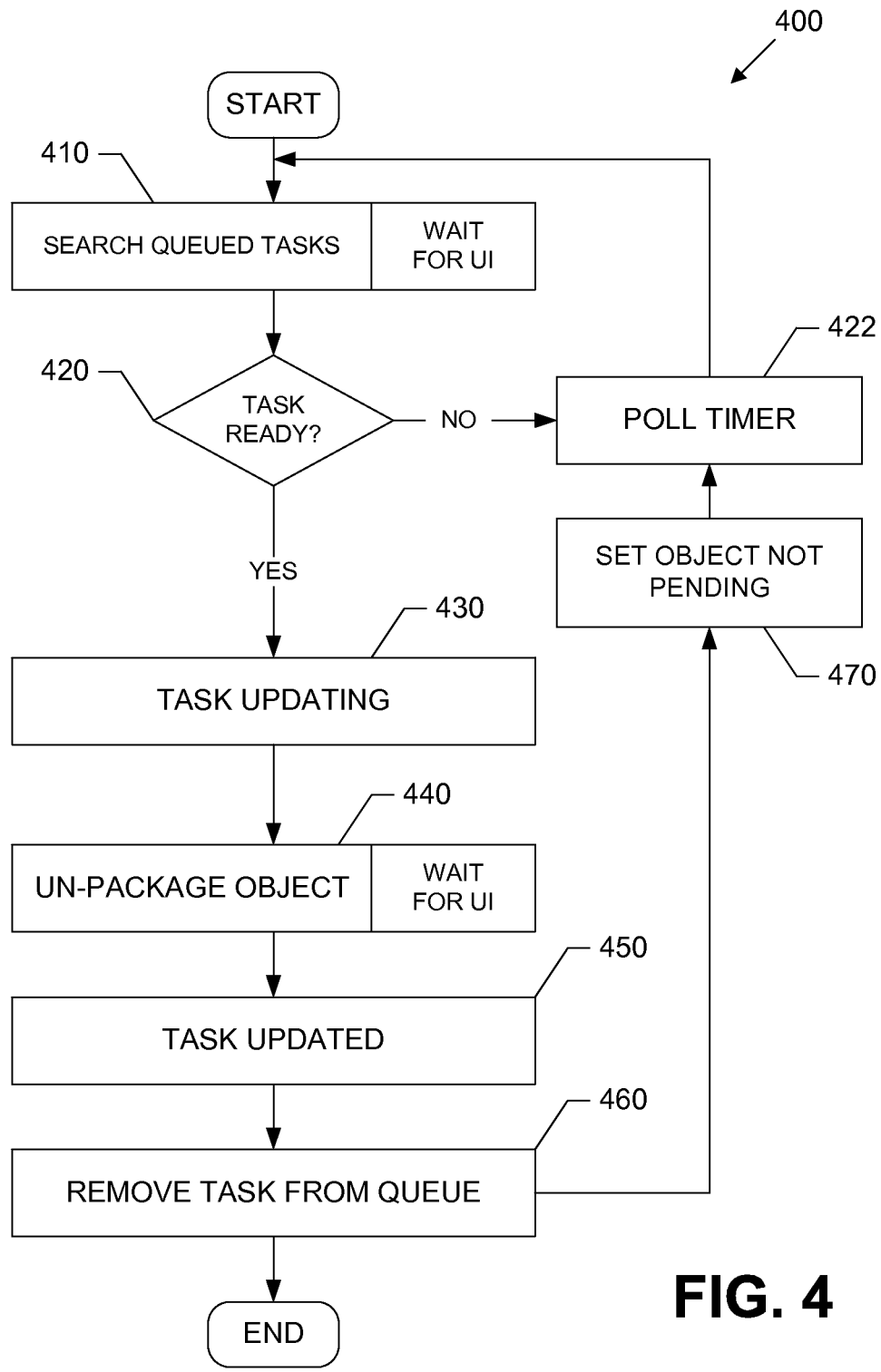
FIG. 4 is a flow diagram illustrating a media authoring method for processing a thread for an object in accordance with another implementation of the present invention.

FIG. 4 is a flow diagram 400 illustrating a media authoring method for processing a thread for an object in accordance with another implementation of the present invention. In the illustrated implementation of FIG. 4, the processing of the thread involves setting data from a queue including checking for the completion of task, checking and waiting for the user interaction, and removing tasks from the queue. For example, queued tasks are searched, at step 410, while waiting for a user interaction. A determination is made, at step 420, whether a task is ready. If the task is not ready, then the timer is polled, at step 422. Otherwise, if the task is ready, the task is updated, at step 430. The processing continues with un-packaging of objects, at step 440, while waiting for user interaction. The task is then updated, at step 450, and is removed from the queue, at step 460. The processing continues with setting the object as not pending, at step 470, and polling the timer again, at step 422.

As described above, implementations of the present invention include method, system, and storage medium to manage multi-threaded computer processing, including: processing a main thread for an object in background of the multi-threaded computer processing without locking the object during its process in the background, wherein processing a main thread includes: monitoring the state of the object, wherein the object is deemed ready for processing after it satisfies a set of rules to check for its completeness, and the object has not been modified for a pre-determined period of time; creating and adding tasks to a queue for processing once the object is ready; and packaging required information for the tasks into a single data structure that is passed to a task thread and returned to the main thread upon completion. Implementations further include: tracking load of the tasks; and throttling a number of background tasks to keep below a load threshold to ensure smooth user experience. Implementations further include processing the tasks including pausing the tasks when an application is exited, and resuming or restarting the tasks when the application is started again. Implementations further include processing the tasks including aborting and re-scheduling the tasks when the object is either being processed, waiting to be processed, or modified by the user. Implementations also include wherein monitoring the state of the object includes: monitoring completeness of the object; and setting the set of rules to automatically create the tasks for the completed object. Implementations also include wherein the packaged required information comprises data passed between the main thread and the task thread that minimizes disruption on the main thread. Implementations further include processing user-generated messages when the main thread is idling.

Regarding messages and message queues, user actions are translated into a message, which is added to a central main thread message queue. If the main thread is busy, then the messages/commands are queued, but are not handled until the queue is available to process the messages. The timer call is invoked through an added message as well.

When objects are searched, packaged, or unpackaged (in steps 122, 112, 440), they are executed in the main thread. If these steps take too long to execute, the steps block the user interface (UI), and the user experience deteriorates. That is, the UI freezes until the task finishes. Therefore, using the timer to keep pace (e.g. every 8 seconds), if the elapsed time interval is less than 8 seconds (i.e., delta=current time−last timer message time <8 seconds), then the message queue is empty, and the UI is free. Thus, the background tasks (e.g., steps 122, 112, and 440) would continue to run. If the delta is much greater than 8 seconds, then the background task update would stop and the message queue is "pumped" or emptied. This involves processing mouse clicks and related user actions. Once the message queue is emptied, the background tasks resume. This is the "Wait For UI" mechanism, and it is checked several times during the background related update calls. For example, a video has 1500 subtitles, and the background task processes them in a non-blocking background thread without main thread restrictions. However, once the task is done, it needs to update the main thread object (e.g., at step 440), which can take a long time to complete. Therefore, 'Wait for UI' mechanism is inserted when it is necessary, and step 440 is done one at a time, so that the updating does not overwhelm the UI.

Regarding timers, polling timers of steps 120 and 422 are the same timer. As mentioned, these are system timers which represent a recurring call with a set delay. Polling thread (step 312) is a looping call with a delay mechanism and is not a system timer. This loop is exited on project close or application close. Object or task state changes of steps 126, 342, 344, 430, and 450 are assignments and not actions.

The foregoing systems and methods and associated devices and modules are susceptible to many variations. Additionally, for clear and brief description, many descriptions of the systems and methods have been simplified. Many descriptions use terminology and structures of specific standards. However, the disclosed systems and methods are more broadly applicable.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method to manage multi-threaded computer processing, comprising:
processing a main thread for an object in background of the multi-threaded computer processing without locking the object during its process in the background,
wherein processing a main thread comprises:
monitoring a state of the object, wherein the object is deemed ready for processing after the object satisfies a set of rules to check for its completeness, and the object has not been modified for a pre-determined period of time;
creating and adding tasks to a queue for processing once the object is ready; and
packaging required information for the tasks into a single data structure that is passed to a task thread, processed by the task thread, and returned to the main thread upon completion of the tasks by the task thread while the main thread is idling,
wherein packaging of the required information for the tasks into the single data structure reduces disruption on the main thread.

2. The method of claim 1, further comprising:
tracking load of the tasks; and
throttling a number of background tasks to keep below a load threshold to ensure smooth user experience.

3. The method of claim 1, further comprising
processing the tasks including pausing the tasks when an application is exited, and resuming or restarting the tasks when the application is started again.

4. The method of claim 1, further comprising
processing the tasks including aborting and re-scheduling the tasks when the object is either being processed, waiting to be processed, or modified by a user.

5. The method of claim 1, wherein monitoring the state of the object comprises:
monitoring completeness of the object; and
setting the set of rules to automatically create the tasks for the object.

6. The method of claim 1, further comprising
processing user-generated messages when the main thread is idling.

7. A system to manage multi-threaded computer processing, comprising:
a main thread processor configured to process an object in background of the multi-threaded computer processing without locking up the object during its process in the background,
wherein the main thread processor comprises:
an object monitor to monitor a state of the object, wherein the object is deemed ready for processing after it satisfies a set of rules to check for its completeness, and the object has not been modified for a pre-determined period of time;

a task creator to create and add tasks to a queue for processing once the object is ready; and a packager configured to package required information for the tasks into a single data structure that is passed to a task thread, processed by the task thread, and returned to the main thread upon completion of the tasks by the task thread while the main thread is idling, wherein the packager packages the required information for the tasks into the single data structure to reduce disruption on the main thread.

8. The system of claim 7, further comprising a scheduler configured to track load of the tasks, and throttle a number of background tasks to keep below a load threshold to ensure smooth user experience.

9. The system of claim 7, further comprising a task processor configured to pause the tasks when an application is exited, and resume or restart the tasks when the application is started again.

10. The system of claim 7, further comprising a task processor configured to abort and re-schedule the tasks when the object is either being processed, waiting to be processed, or modified by a user.

11. The system of claim 7, wherein the object monitor monitors completeness of the object and sets the set of rules to automatically create the tasks for the object.

12. The system of claim 7, further comprising a processor configured to process user-generated messages when the main thread is idling.

13. A non-transitory storage medium storing a computer program to manage multi-threaded computer processing, the computer program comprising executable instructions that cause the computer to:

process a main thread for an object in background of the multi-threaded computer processing without locking up the object during its process in the background, wherein the executable instructions that cause the computer to process a main thread comprises executable instructions that cause the computer to:

monitor a state of the object, wherein the object is deemed ready for processing after it satisfies a set of rules to check for its completeness, and the object has not been modified for a pre-determined period of time;

create and add tasks to a queue for processing once the object is ready; and package required information for the tasks into a single data structure that is passed to a task thread, processed by the task thread, and returned to the main thread upon completion of the tasks by the task thread while the main thread is idling, wherein packaging of the required information for the tasks into the single data structure reduces disruption on the main thread.

14. The non-transitory storage medium of claim 13, further comprising executable instructions that cause the computer to:

track load of the tasks; and throttle a number of background tasks to keep below a load threshold to ensure smooth user experience.

15. The non-transitory storage medium of claim 13, further comprising executable instructions that cause the computer to process the tasks including executable instructions that cause the computer to abort and re-schedule the tasks when the object is either being processed, waiting to be processed, or modified by a user.

16. The non-transitory storage medium of claim 13, wherein executable instructions that cause the computer to monitor the state of the object comprises executable instructions that cause the computer to:

monitor completeness of the object; and set the set of rules to automatically create the tasks for the object.

17. The non-transitory storage medium of claim 13, further comprising executable instructions that cause the computer to process user-generated messages when the main thread is idling.

* * * * *